US012664182B2

(12) United States Patent
Chajewska et al.

(10) Patent No.: US 12,664,182 B2
(45) Date of Patent: Jun. 23, 2026

(54) GENERATING IMPROVED TECHNICAL REPORTS USING MACHINE-LEARNING MODELS AND LARGE GENERATIVE MODELS

(71) Applicant: Microsoft Technology Licensing, LLC, Redmond, WA (US)

(72) Inventors: Urszula Stefania Chajewska, Camano Island, WA (US); Harsh Shrivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/488,758

(22) Filed: Oct. 17, 2023

(65) Prior Publication Data

US 2025/0124059 A1     Apr. 17, 2025

(51) Int. Cl.
*G06F 16/332*          (2019.01)
*G06F 40/40*           (2020.01)

(52) U.S. Cl.
CPC .......... *G06F 16/3328* (2019.01); *G06F 40/40* (2020.01)

(58) Field of Classification Search
CPC .... G06F 16/3328; G06F 16/332; G06F 40/20; G06F 40/40; G06F 40/30
See application file for complete search history.

(56) References Cited

U.S. PATENT DOCUMENTS

| | | | |
|---|---|---|---|
| 2024/0386313 A1* | 11/2024 | Pedersen | G06F 40/30 |
| 2024/0427807 A1* | 12/2024 | Corlatescu | G06F 16/3325 |
| 2025/0111147 A1* | 4/2025 | Pryzant | G06F 40/56 |

* cited by examiner

*Primary Examiner* — Huyen X Vo
(74) *Attorney, Agent, or Firm* — Ray Quinney & Nebeker P.C.; Christopher K. Hallstrom

(57)          ABSTRACT
The disclosure relates to utilizing a domain insight system for providing plain language descriptions and insights into complex data and/or sparsely populated domains using machine-learning models and large generative models. For instance, the domain insight system converts data outputs from machine-learning models in various output formats into clear, accurate, comprehensible, and straightforward results. The domain insight system achieves this by using one or more dynamic prompts that are tailored based on the data output types and report descriptors, thus improving the accuracy and efficiency of the large generative model. In particular, the domain insight system uses specialized prompts with carefully selected parameters and, in some cases, system-level meta-prompts, to generate accurate domain-based reports and explanations for a given dataset.

20 Claims, 8 Drawing Sheets

100

200

600     602

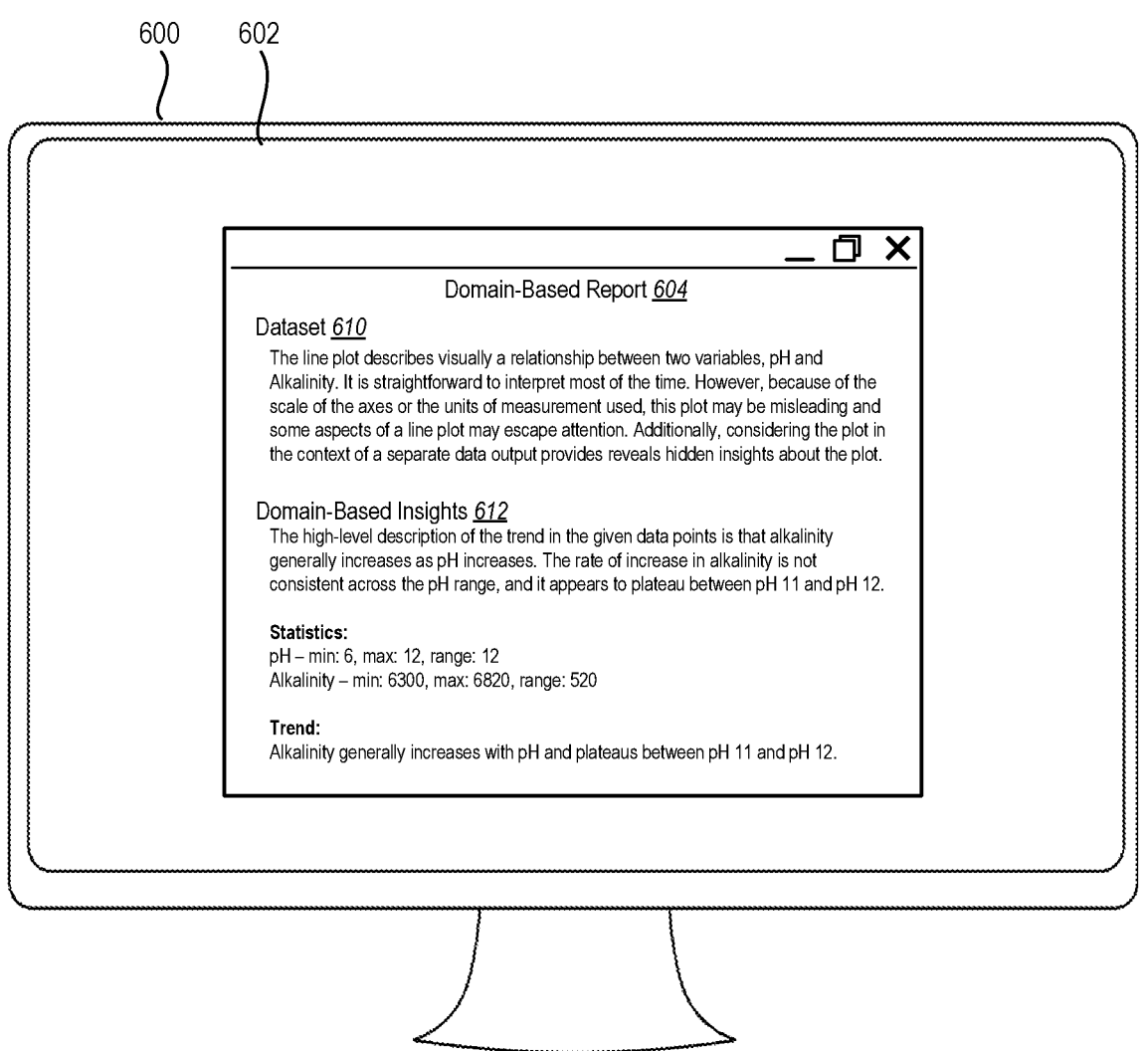

Domain-Based Report *604*

Dataset *610*

The line plot describes visually a relationship between two variables, pH and Alkalinity. It is straightforward to interpret most of the time. However, because of the scale of the axes or the units of measurement used, this plot may be misleading and some aspects of a line plot may escape attention. Additionally, considering the plot in the context of a separate data output provides reveals hidden insights about the plot.

Domain-Based Insights *612*

The high-level description of the trend in the given data points is that alkalinity generally increases as pH increases. The rate of increase in alkalinity is not consistent across the pH range, and it appears to plateau between pH 11 and pH 12.

Statistics:
pH – min: 6, max: 12, range: 12
Alkalinity – min: 6300, max: 6820, range: 520

Trend:
Alkalinity generally increases with pH and plateaus between pH 11 and pH 12.

Generating Data Outputs Using One Or More Machine-Learning Models For A Set Of Input Data *710*

Determining A Prompt For A Large Generative Model Based On The Data Outputs And Report Descriptors Of A Domain-Based Report *720*

Generating A Domain-Based Report Using A Large Generative Model Based On The Set Of Input Data, The Data Outputs, And The Context Prompt *730*

GENERATING IMPROVED TECHNICAL REPORTS USING MACHINE-LEARNING MODELS AND LARGE GENERATIVE MODELS

BACKGROUND

In recent years, there has been significant advancement in both hardware and software within the realm of computational devices, with a pronounced emphasis on improving the processing and analysis of datasets. This progress has led to the development of systems aimed at handling extensive and intricate datasets, frequently employed by data scientists involved in computationally intensive tasks. Many of these systems incorporate models designed to produce outputs such as tables, charts, and visual representations. In some instances, these models generate technically correct outputs, but due to their complexity, prove challenging for users to interpret effectively. However, in other instances, these models produce erroneous outputs but the complexity of these outputs makes it difficult to discern that the outputs are incorrect or diagnose the underlying problems with the model or the dataset. These and other problems currently exist in the area of dataset processing and exploration.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIG. 6 illustrates an example graphical user interface for displaying a domain-based report generated by a large generative model.

DETAILED DESCRIPTION

Figure 1:
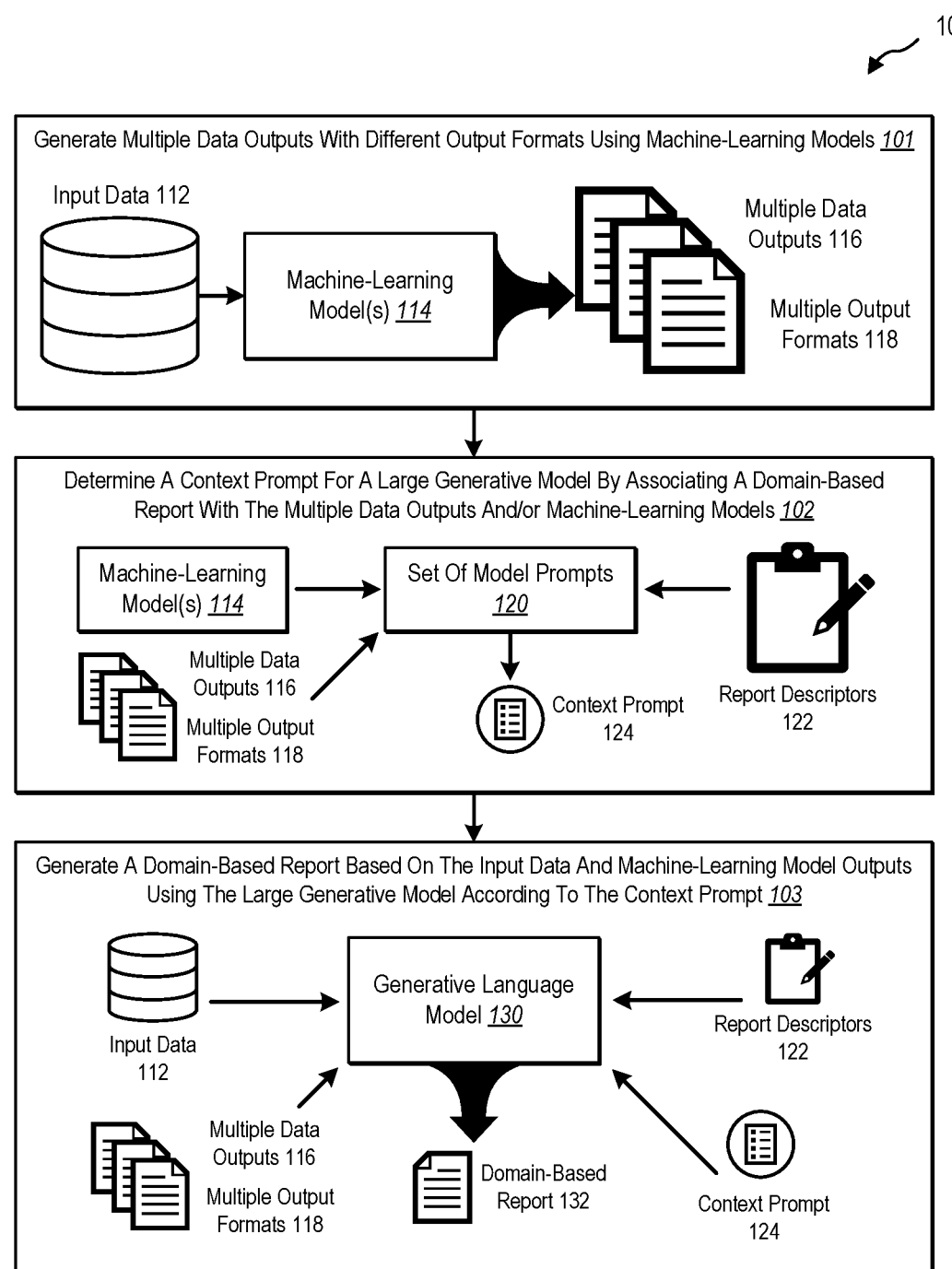
FIG. 1 illustrates an example overview for implementing the domain insight system to generate a domain-based report utilizing machine-learning models and a large generative model.

This disclosure describes utilizing a domain insight system for providing plain language descriptions and insights into complex data and/or sparsely populated domains using machine-learning models and large generative models. For instance, the domain insight system converts data outputs from machine-learning models in various output formats into clear, accurate, comprehensible, and straightforward results. The domain insight system achieves this by using one or more dynamic prompts that are tailored based on the data output types and report descriptors or instructions, thus improving the accuracy and efficiency of the large generative model. In particular, the domain insight system uses specialized prompts with carefully selected parameters and, in some cases, system-level meta-prompts, to generate accurate domain-based reports and explanations for a given dataset.

In particular, implementations of the present disclosure provide benefits and solve problems in the art with systems, computer-readable media, and computer-implemented methods using a domain insight system that generates domain-based reports from complicated datasets utilizing a combination of machine-learning models and large generative models. As further provided below, the domain insight system provides improved accuracy and efficiency compared to existing systems.

By way of example, in one or more implementations, upon receiving a set of input data, the domain insight system generates multiple data outputs in multiple output formats using one or more machine-learning models. Based on associating, correlating, and/or matching report descriptors (e.g., report instructions) of a domain-based report and the multiple output formats, the domain insight system determines a dynamic prompt to use with a large generative model. The domain insight system then generates the domain-based report based on the set of input data, the multiple data outputs, the context prompt, the report descriptors of the domain-based report, and/or system-level meta-prompts using the large generative model.

As described in this disclosure, the domain insight system delivers several significant technical benefits in terms of computing accuracy and efficiency compared to existing systems. Moreover, the domain insight system provides several practical applications that address problems related to generating domain-based reports using multiple machine-learning models and dynamic model prompts.

To elaborate, consider a scientist who has finished running an expensive experiment with a set of sensors that collected data at different points in time and generated a dataset. The scientist may use statistical tools from existing systems to explore such a dataset. Unfortunately, the tools offered by existing systems can produce misleading or inaccurate results. Further, even with accurate results, the data output may be overwhelming and confusing. Even existing systems that use large language models often produce incorrect results that may go unnoticed by users.

As mentioned above, the domain insight system utilizes one or more machine-learning models in combination with a large generative model. Additionally, the domain insight system uses dynamic prompts based on data outputs and report descriptors to guide the large generative model. By using dynamic prompts, the domain insight system improves the accuracy and efficiency of the large generative model. For instance, in various instances, the dynamic prompts include carefully chosen parameters determined to produce correct and consistent explanations that provide plain-meaning explanations of a domain. For example, based on the data type of data output from a machine-learning model, the dynamic prompts include specific instructions, such as statistical measures to compute, important aspects of the output data, and desired explanation types.

In many instances, by using dynamic prompts that provide context information into datasets, the domain insight system generates significant insights about datasets and their domains. In particular, the domain insight system provides accurate insights into datasets with a mismatched ratio of samples to features (e.g., relatively few samples to many features), which are hard to analyze using existing systems.

In various implementations, the dynamic prompts flexibly accommodate multiple data outputs generated by one or more machine-learning models where the multiple data outputs include multiple different data formats from a dataset. In these cases, the domain insight system determines dynamic prompts that instruct the large generative model to incorporate one data output into another data output. This way, the domain insight system provides a single dynamic prompt to a large generative model that guides it to generate accurate, efficient, and plain language results regarding the domain to which the dataset belongs In some implementations, the dynamic prompts include visualization types, data semantics, data meanings, and variables of interest. In various implementations, the dynamic prompts include system-level prompts, which provide important context information, such as meta-information about the domain data, report audience level (e.g., scientist, student, parent, customer, etc.), to the large generative model. By generating and providing system-level prompts, the domain insight system provides general framing information and ensures that the large generative model understands the correct context, syntax, and grounding information of the input data and/or output data it is processing, which prevents it from producing incorrect results. The additional metadata provides context information that allows the large generative model to operate more efficiently as it focuses on a specific domain. Furthermore, the dynamic prompts may provide guidelines for responsible artificial intelligence (AI) considerations.

In some implementations, the domain insight system uses specialized models in addition to the machine-learning model. For example, based on the data output format of a machine-learning model, the domain insight system determines to refine the data output using a specialized model to generate a particular output. Commonly, a specialized model is used to generate refined data output when the domain insight system determines that the large generative model is unable to efficiently or accurately process the data output to generate the domain-based report. This way, by using specialized models, the domain insight system improves the overall accuracy and efficiency of the large generative model and the accuracy of the domain-based report.

As illustrated in the foregoing discussion, this disclosure utilizes a variety of terms to describe the features and advantages of one or more implementations described. To illustrate, this disclosure describes the domain insight system in the context of a cloud computing system. As an example, the term "cloud computing system" refers to a network of interconnected computing devices that provide various services and applications to computing devices (e.g., server devices and client devices) inside or outside of the cloud computing system. Additional terms are defined throughout the document in different examples and contexts.

For example, the term "machine learning" refers to algorithms that generate data-driven predictions or decisions from known input data by modeling high-level abstractions. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. Examples of machine-learning models include latent Dirichlet allocation (LDA), multi-arm bandit models, linear regression models, logistic regression models, random forest models, support vector machines (SVMs) models, neural networks (convolutional neural networks (CNNs), recurrent neural networks such as LSTMs, graph neural networks, etc.), or decision tree models.

While a machine-learning model includes large generative models, this document uses the term "machine-learning model" to refer to non-large generative models. That is, unless stated otherwise, the term "machine-learning model" references a model that is not a large generative model. Additionally, the term "data output" in this document refers to data generated by a machine-learning model rather than data generated by a large generative model.

As an example, a "large generative model" (LGM) is a large artificial intelligence system that uses deep learning to produce coherent and contextually relevant text based on patterns learned from large amounts of training data. In various implementations, a generative learning model, such as a multi-modal generative model. In many instances, a generative model refers to an advanced computational system that uses natural language processing, machine learning, and/or image processing to generate coherent and contextually relevant human-like responses.

Large generative models include Large Language Models (LLMs), which are primarily based on transformer architectures to understand, generate, and manipulate human language. LLMs can also use a recurrent neural network (RNN) architecture, long short-term memory (LSTM) model architecture, convolutional neural network (CNN) architecture, or other architecture types. Examples of LLMs include generative pre-trained transformer (GPT) models including GPT-3.5 and GPT-4, bidirectional encoder representations from transformers (BERT) model, text-to-text transfer transformer models such as T5, conditional transformer language (CTRL) models, and Turing-NLG. Other types of large generative models include sequence-to-sequence models (Seq2Seq), vanilla RNNs, and LSTM networks.

Large generative models have a large number of parameters (e.g., in the billions or trillions) and are trained on a vast dataset to produce fluent, coherent, and topic-specific outputs (e.g., text and/or images). Large generative models have applications in natural language understanding, content generation, text summarization, dialog systems, language translation, creative writing assistance, and image generation. A single large generative model performs a wide range of tasks based on receiving different inputs, such as prompts (e.g., input instructions, rules, example inputs, example outputs, and/or tasks), data, and/or access to data. In response, the large generative model generates various output formats ranging from one-word answers to long narratives, images and videos, labeled datasets, documents, tables, and presentations.

In this disclosure, the term "prompt" refers to a query provided to a large generative model that provides instructions, guidelines, and/or parameters for generating an answer or result. A prompt may include a dynamic prompt that includes carefully selected parameters determined based on various factors, such as machine-learning model types, data output formats, domain-based report descriptors (e.g., report instructions), and/or other factors. A prompt may also include a system-level prompt that includes meta-information of a domain. Further, a prompt may include and/or reference additional information being provided to a large generative model, such as input data, output data, refined output data, and/or domain-based report descriptors.

The term "domain" refers to a well-defined and specialized area of expertise where data-driven techniques are applied to solve industry-specific challenges. A domain encompasses the unique characteristics and intricacies of a given area or field, often involving domain-specific terminology, data sources, and expert knowledge. Examples of domains include healthcare (e.g., cancer research, protein digestion, pharmaceuticals), environmental science (e.g., biogas production), manufacturing, energy, e-commerce, education, marketing, agriculture, finance, and transportation.

Additionally, as an example, a "network" refers to one or more data links that enable electronic data transport between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

Additional example implementations and details of the domain insight system are discussed in connection with the accompanying figures, which are described next. For example, FIG. 1 illustrates an example overview for implementing the domain insight system to generate a domain-based report utilizing machine-learning models and a large generative model in accordance with one or more implementations. As shown, FIG. 1 illustrates a series of acts 100 performed by the domain insight system within a cloud computing system.

As shown, the series of acts 100 includes act 101 of generating multiple data outputs with different output formats using machine-learning models. For example, upon obtaining a set of input data 112, the domain insight system uses at least one machine-learning model 114 to generate multiple data outputs 116 with multiple output formats 118. In some instances, act 101 includes one machine-learning model generating data output of one data format type. In various implementations, the domain insight system uses models other than machine-learning models to generate the multiple data outputs 116.

Examples of output formats include graphs, plots (including histograms), visualizations, tables (e.g., tabular data), lists, and other data structures. In some implementations, a machine-learning model outputs data in a raw data format. For instance, the set of input data 112 is tabular data and a machine-learning model is a graph recovery model that generates a conditional independence graph. The same or different machine-learning model may generate a different data output from the set of input data 112.

As shown, act 102 includes determining a context prompt for a large generative model by associating a domain-based report with the multiple outputs and/or machine-learning models. For example, based on the data, features, and elements identified between the output data and the report descriptors 122 (e.g., report instructions), the domain insight system determines a dynamic LGM prompt (e.g., context prompt 124) from a set of model prompts 120 to provide to the large generative model 130. In various implementations, the domain insight system also provides a system-level prompt to the large generative model 130, which may include meta-information and contexts that provide general framing information and/or responsible AI considerations. Additional details regarding dynamic prompts including system-level prompts are provided below in connection with FIG. 3.

As shown, act 103 includes generating a domain-based report based on the set of input data and machine-learning model outputs using the large generative model according to the context prompt. In one or more implementations, the domain insight system provides the context prompt 124 with other inputs included or indicated in the prompt to the large generative model 130, as shown. Following the context prompt 124 and, in some instances, the set of input data 112, the large generative model 130 processes the set of input data 112 and/or the multiple data outputs 116 to generate a domain-based report 132.

In many implementations, the domain-based report 132 includes one or more plain language narratives of the domain to which the set of input data 112 belongs as determined by the large generative model 130 using the set of input data 112 and/or the multiple data outputs 116. This way, the domain insight system leverages the power of large language models to accurately and easily explain complicated datasets to non-technical users in natural language when the multiple data outputs 116 are otherwise complex and difficult to interpret and understand.

Figure 2:
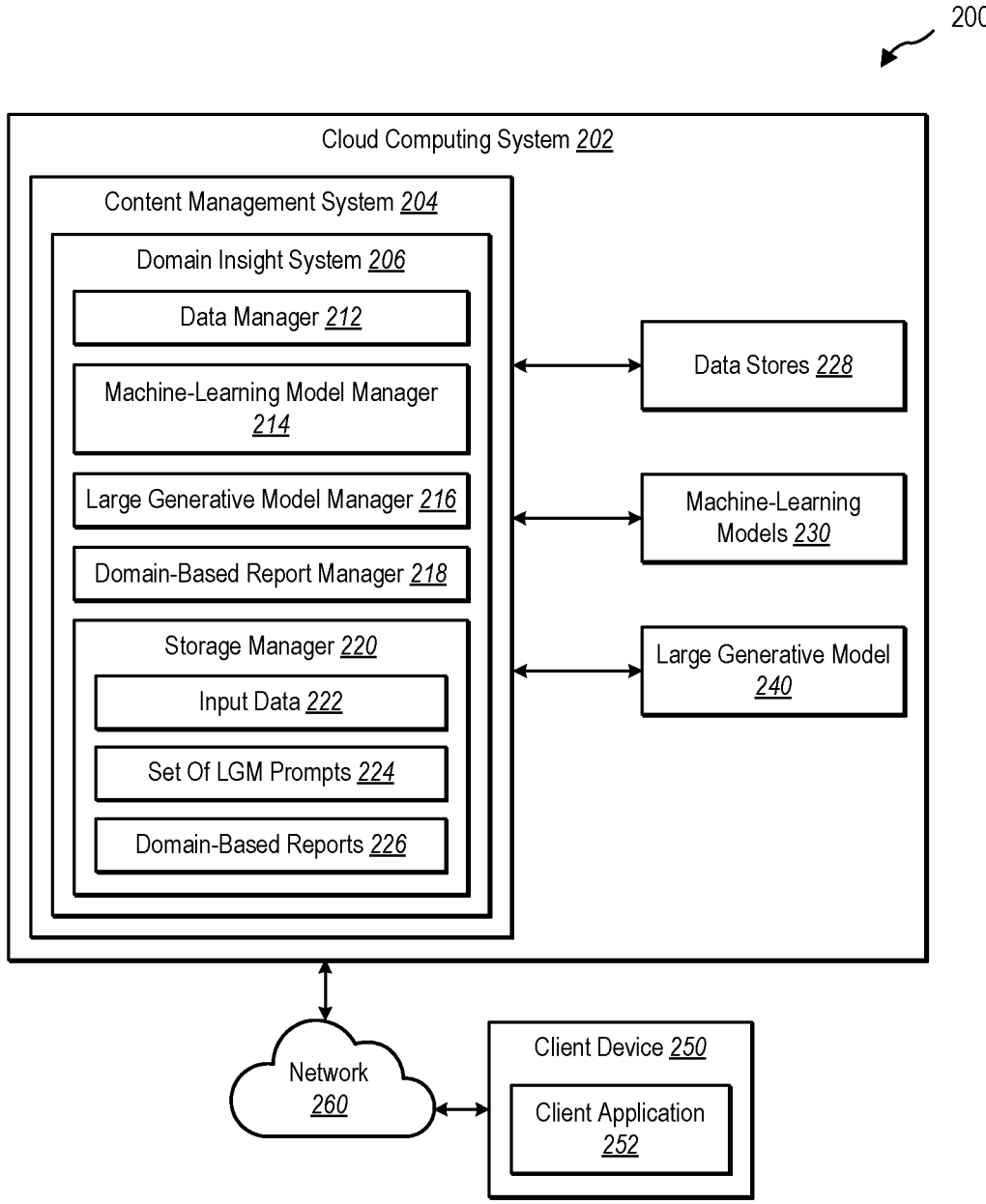
FIG. 2 illustrates an example computing environment where the domain insight system is implemented in a cloud computing system.

With a general overview in place, additional details are provided regarding the components, features, and elements of the domain insight system. To illustrate, FIG. 2 shows an example computing environment where the domain insight system is implemented in a cloud computing system according to some implementations. In particular, FIG. 2 illustrates an example of a computing environment 200 of various computing devices within a cloud computing system 202 associated with a domain insight system 206. While FIG. 2 shows example arrangements and configurations of the computing environment 200, the cloud computing system 202, the domain insight system 206, and associated components, other arrangements and configurations are possible.

As shown, the computing environment 200 includes a cloud computing system 202 and a client device 250 connected via a network 260. The cloud computing system 202 includes a content management system 204, data stores 228, machine-learning models 230, and a large generative model 240. Each of these components may be implemented on one or more computing devices, such as on a set of one or more server devices. Further details regarding computing devices are provided below in connection with FIG. 7 along with additional details regarding networks, such as the network 260 shown.

The content management system 204 performs a variety of functions. For example, in one or more implementations, the content management system 204 facilitates receiving, storing, and accessing various datasets, such as data stored by the data stores 228. The content management system 204 may also facilitate user interactions with data and domain-based reports, such as with a user associated with the client device 250.

As shown, the content management system 204 includes the domain insight system 206. In some implementations, the content management system 204 is located on a separate computing device from the content management system 204 within the cloud computing system 202. For example, the domain insight system 206 is on another server device, or the domain insight system 206 is located wholly or in part on the client device 250.

As mentioned earlier, the domain insight system 206 generates domain-based reports that provide clear and concise text narratives for complicated datasets. As shown, the domain insight system 206 includes various components and elements, which are implemented in hardware and/or software. For example, the domain insight system 206 includes a data manager 212, a machine-learning model manager 214, a large generative model manager 216, a domain-based report manager 218, and a storage manager 220 having input data 222, a set of LGM prompts 224, and domain-based reports 226.

As shown, the domain insight system 206 also includes the data manager 212. In various implementations, the data manager 212 manages receiving, accessing, and handling data from datasets. For example, the data manager 212 accesses the input data 222 from the data stores 228, experiments, and/or other sources. The data manager 212 may provide the data to the machine-learning model manager 214 to generate data outputs.

The domain insight system 206 also includes the machine-learning model manager 214. In various implementations, the machine-learning model manager 214 manages the machine-learning model 230 to generate data outputs. Often, the machine-learning model manager 214 will use the same input data with multiple machine-learning models to generate multiple data outputs, often in different data formats. In some implementations, the machine-learning model manager 214 will use different input data with multiple machine-learning models to generate multiple data outputs.

In some instances, the machine-learning model manager 214 generates refined data outputs using a specialized model from the machine-learning models 230. For example, the machine-learning model manager 214 provides data output from a machine-learning model to a specialized model to generate refined data output. In some implementations, the machine-learning model manager 214 or another component may determine when to apply a specialized model, as discussed further below.

As shown, the domain insight system 206 includes the large generative model manager 216. In various implementations, the large generative model manager 216 communicates with the large generative model 240 to generate domain-based reports 226 that include text narrative responses. For example, the large generative model manager 216 determines one or more dynamic model prompts from the set of LGM prompts 224 to provide to the large generative model 240 along with corresponding inputs.

As shown, the cloud computing system 202 includes the client device 250. In various implementations, the client device 250 is associated with a user (e.g., a user client device), such as an administrator who interacts with the domain insight system 206 to request and receive domain-based reports 226. For example, the client device 250 includes a client application 252, such as a web browser or another form of computer application for accessing and/or interacting with the domain insight system 206.

Figure 3:
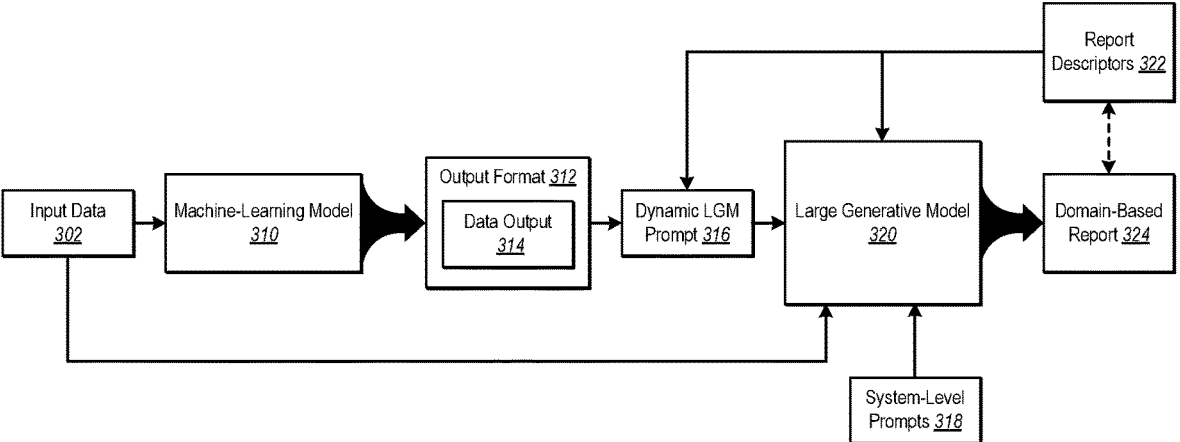
FIG. 3 illustrates an example diagram of generating a domain-based report based on a single machine-learning model and a large generative model.
Figure 4:
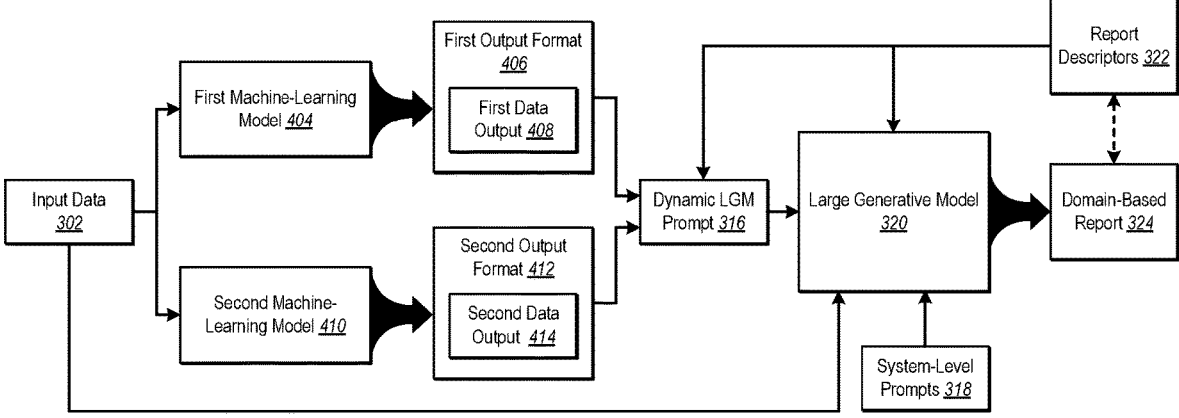
FIG. 4 illustrates an example diagram of generating a domain-based report based on multiple machine-learning models and a large generative model.
Figure 5:
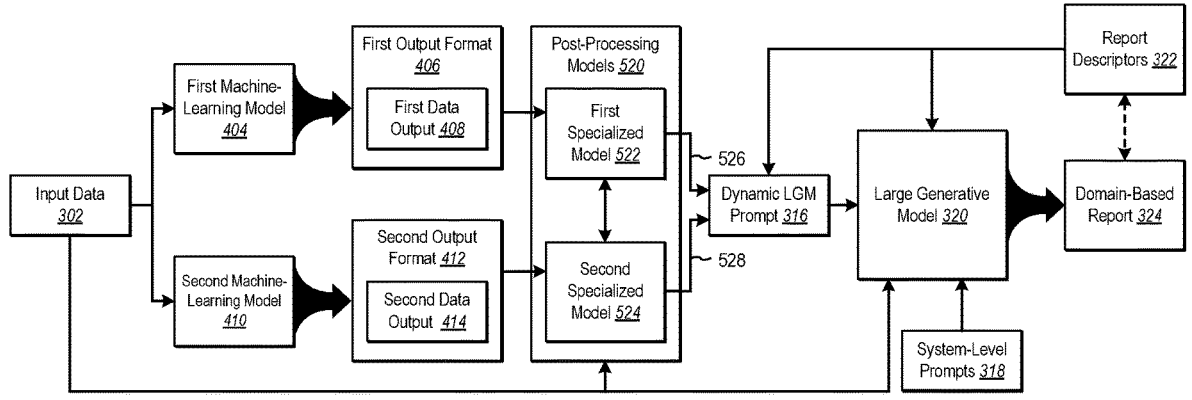
FIG. 5 illustrates an example diagram of generating a domain-based report based on multiple machine-learning models, one or more specialized models, and a large generative model.

FIGS. 3-5 provide different framework examples corresponding to various implementations of the domain insight system. For example, FIG. 3 includes a single-path, single-data output framework for generating a domain-based report based on input data, FIG. 4 expands the concept to a multi-path, multi-data output framework, and FIG. 5 further expands the concept by introducing specialized models. While particular arrangements are shown, alternative arrangements are possible. For example, a specialized model shown in FIG. 5 can be added to the single-data output framework of FIG. 3.

As previously mentioned, FIG. 3 illustrates an example diagram of generating a domain-based report based on a single machine-learning model and a large generative model according to some implementations of the domain insight system. As shown, FIG. 3 includes a single-path, single-data output framework for generating a domain-based report based on input data, a single machine-learning model, and a large generative model.

As shown, FIG. 3 includes input data 302, a machine-learning model 310, data output 314 having an output format 312, a dynamic LGM prompt 316, a system-level prompt 318, a large generative model 320 (LGM), report descriptors 322 (e.g., report instructions), and a domain-based report 324. Each of these components and elements is described below.

In various implementations, the domain insight system 206 provides the input data 302 to the machine-learning model 310 to generate the data output 314. For example, the input data 302 includes datasets of complicated data, such as collected data, synthetic data, time series data, researched data, experimental data, tabular (table) data, random samples of data, feature-based data, structured data, unstructured data, or other types of data. In a few instances, the input data 302 includes less complex or limited amounts of data. In various implementations, the domain insight system 206 uses another model other than a machine-learning model to generate the data output 314. For example, the domain insight system 206 uses a deterministic model or another algorithm-based model.

In various implementations, the machine-learning model 310 is selected based on the type of input data selected. As an example, the machine-learning model 310 is a graph recovery model that generates conditional independence graphs from time series data. As another example, the machine-learning model 310 is a probabilistic graphical model that learns a joint probability distribution from data or an interpretable predictive model that outputs a plot showing how the output variable depends on an input variable. The machine-learning model 310 represents a variety of machine-learning model types that generate various data outputs.

As shown, the domain insight system 206 uses the machine-learning model 310 to generate the data output 314 from the input data 302. The data output 314 may have one of many types of output format 312. Examples of output formats include visualizations, graphs, plots, tables (tabular output), matrices, maps, vectors, or other data structures. In general, the machine-learning model 310 generates data of the same output format, which reflects the modality of the model, but with different data outputs. Thus, the output format 312 represents the data structure of the data generated by the machine-learning model 310 while the data output 314 represents the content of the generated data.

The domain insight system 206 also determines the dynamic LGM prompt 316 (e.g., a context prompt) from a set of LGM prompts. For example, the domain insight system 206 associates the data output 314 with the report descriptors 322 of the domain-based report 324 to identify the dynamic LGM prompt 316. For example, the domain insight system 206 analyzes the data output 314, the output format 312, and/or the machine-learning model 310 to identify a first set of features, characteristics, and/or attributes. In addition, the domain insight system analyzes the report descriptors 322 of the domain-based report to identify a second set of requirements, forms, fields, and features of the report. Based on the identified sets of data, the domain insight system 206 determines the dynamic LGM prompt 316 to provide to the large generative model 320.

In various implementations, the first set of data includes domain information and contexts about the data output 314, information about data generated by the machine-learning model 310, and/or how the data output is represented (e.g., the output format 312). In various implementations, the second set of data includes various parameters and/or instructions about what is included in the domain-based report, such as the domain of the report (e.g., a domain descriptor and/or instructions), the sections in the report (e.g., section parameters and/or instructions), content to be included in the report and/or each section (e.g., content parameters and/or instructions), queries to answer (e.g., query parameters and/or instructions), visualizations to include (e.g., visualization parameters and/or instructions), and/or the level of technical details at which queries should be explained (e.g., technical level parameters and/or instructions).

Based on associating features, instructions, and/or parameters between the two sets, the domain insight system 206 identifies an LGM prompt from a set of LGM prompts. For example, prompts in the set of LGM prompts are associated with corresponding features, instructions, and/or parameters to the sets, which the domain insight system 206 matches to select the dynamic LGM prompt 316. For instance, the domain insight system 206 selects an LGM prompt with the highest number of overall matches (with a minimum number for each set) or selects an LGM prompt based on mapping the data points to an embedding space and selecting the closest LGM prompt. In some instances, the domain insight system 206 selects the dynamic LGM prompt 316 based on a rule set that indicates which prompt to select based on the machine-learning model 310, data output 314, and/or output format 312 as well as one or more parameters and/or instructions of the report descriptors 322.

In some instances, the domain insight system 206 selects the dynamic LGM prompt 316 from only the data output 314, the output format 312, the machine-learning model 310, or the report descriptors 322. For instance, based on the machine-learning model 310 generating a particular type of output format 312, the domain insight system 206 determines the dynamic LGM prompt 316 from the machine-learning model 310. In some instances, the domain insight system 206 determines a domain descriptor of the domain-based report from the report descriptors 322 and matches it to the output format 312 of the data output 314 to identify the dynamic LGM prompt 316. In another case, the domain insight system 206 selects the dynamic LGM prompt 316 by analyzing one or more of the report descriptors 322.

As mentioned earlier, the dynamic LGM prompt 316 includes domain-specific directions for the large generative model 320 to generate the domain-based report 324. For example, in various implementations, the dynamic LGM prompt 316 includes specific instructions, important aspects of the data, and/or the type of explanation expected. The dynamic LGM prompt 316 may include statements, questions, explanations, examples, and other text to improve the accuracy and efficiency of the large generative model 320 for the domain of the data as well as guide the large generative model 320 to generate plain-language text narrative responses in the domain-based report 324.

In various implementations, the dynamic LGM prompt 316 includes data provided to the large generative model 320 or access to the data. For example, the domain insight system 206 directly or indirectly provides the large generative model 130 with the input data 302 and/or the data output

314 in the output format 312. In some instances, the domain insight system 206 provides additional data, such as refined output data, which is further described below.

In various implementations, the dynamic LGM prompt 316 provides the report descriptors 322 and/or a domain-based report template to the large generative model 320. In some implementations, one or more report descriptors are incorporated into the statements and questions of the dynamic LGM prompt 316.

In some instances, the domain insight system 206 generates a customized dynamic prompt as the dynamic LGM prompt 316. For example, based on analyzing the output format 312 and/or the data output 314, the domain insight system 206 creates one or more statements or questions to include in an LGM prompt. For instance, the domain insight system 206 detects the domain of the data output 314 and includes domain-based context statements and examples in the prompt. In some instances, the domain insight system 206 determines whether to add one or more statements or questions about the data output 314 to the LGM prompt based on analyzing the report descriptors 322 and identifying content explanations that should be included in the domain-based report 324, such as content parameters and/or instructions within sections of the report.

The domain insight system 206 can provide a system-level prompt 318 to the large generative model 320. In various implementations, the system-level prompt 318 provides meta-information, semantics, and contexts that provide general framing information and/or responsible AI considerations. In various implementations, the domain insight system 206 determines the system-level prompt based on a domain descriptor and/or other parameters (and/or instructions) of the domain-based report 324.

The report descriptors 322 include general framing instructions, audience instructions, and/or responsible AI consideration instructions that influence the system-level prompt 318. In general, responsible AI consideration instructions are provided for domains and reports; however, responsible AI consideration instructions may vary based on the report type. In some implementations, based on the domain descriptor of the report descriptors 322, the domain insight system 206 determines what to include in the system-level prompt 318. For example, in one or more implementations, based on a domain descriptor, the domain insight system 206 includes meta-information, semantics, and contexts of the domain, which may overlap with information from the machine-learning model 310 and/or the data output 314. The domain insight system 206 may also include rules and guidelines for handling data in a given domain in the system-level prompt 318.

In some instances, based on general framing instructions of the report descriptors 322, the domain insight system 206 provides high-level response information about generating the domain-based report 324. For example, based on the general framing instructions, the domain insight system 206 causes the system-level prompt 318 to instruct the large generative model 320 to adopt the perspective of an AI assistant that helps people interpret data and visualizations by describing output data in the form or format of graphs, plots, or tables. In another case, based on the general framing instructions, the domain insight system 206 uses the system-level prompt 318 to ensure that text narrative responses are in plain language by providing the large generative model 320 with the level of complexity that it should use when generating the report and/or how long or short answers should be.

Additionally, a system-level prompt may include privacy rules and other considerations specific to the type of data being processed and/or for whom the domain-based report is being generated. For example, if the domain-based report 324 is being generated for a layperson or a public audience, the system-level prompt 318 includes audience instructions indicating the removal of sensitive data (along with less complex explanation styles). If the domain-based report 324 is being generated for a particular group of data scientists or medical professionals within an authorized area, the system-level prompt 318 includes audience instructions indicating that some or all of the sensitive data is allowed in the domain-based report.

Furthermore, based on responsible response consideration instructions, the domain insight system 206 may include information about various AI considerations in the system-level prompt 318. For instance, the domain insight system 206 includes instructions for properly handling bias mitigation, fairness, transparency, data privacy, liability, security, ethical guidelines, societal impact, environmental considerations, and/or long-term considerations when generating the domain-based report 324. The domain insight system 206 may provide different instructions to the large generative model 320 depending on what is indicated in the responsible response consideration instructions.

As shown in FIG. 3, the large generative model 320 generates the domain-based report 324 based on one or more data inputs (e.g., the input data 302 and/or the data output 314) according to the dynamic LGM prompt 316. Additionally, in some implementations, the large generative model 320 also uses inputs from the system-level prompt 318 and/or the report descriptors 322. By following the dynamic LGM prompt 316 to describe the data output 314, the large generative model 320 provides insights about the domain to which the input data 302 belongs that are both technically accurate and in plain language.

FIG. 4 illustrates an example diagram of generating a domain-based report based on multiple machine-learning models and a large generative model according to some implementations. FIG. 4 expands on the implementations described above. More particularly, while FIG. 3 relates to the domain insight system 206 implementing a single-path, single-data output framework for generating a domain-based report, FIG. 4 relates to the domain insight system 206 implementing a multi-path, multi-data output framework. While FIG. 4 shows two machine-learning models, additional machine-learning models could also be further added following the same principles described below.

As shown, FIG. 4 includes the input data 302, a first machine-learning model 404 that generates a first data output 408 with a first output format 406, and a second machine-learning model 410 that generates a second data output 414 with a second output format 412. While the first output format 406 and the second output format 412 are the same format in some instances, in many instances, the first output format 406 is a different format from the second output format 412. For example, the first output format 406 is graphs while the second output format 412 is tabular data.

In many implementations, the first machine-learning model 404 and the second machine-learning model 410 are different model types. For example, the first machine-learning model 404 uses a first modality and the second machine-learning model 410 uses a second, different modality. In a few cases, the first machine-learning model 404 and the second machine-learning model 410 are the same or similar model types (e.g., similar architectures with the same or similar training).

Likewise, in various implementations, the first machine-learning model 404 and the second machine-learning model 410 generate their different respective data outputs from the input data 302. In some implementations, the first machine-learning model 404 and the second machine-learning model 410 use the same input data. In some implementations, the first machine-learning model 404 and the second machine-learning model 410 use data from the same dataset that is partially or wholly different. In various implementations, the first machine-learning model 404 and the second machine-learning model 410 use input data from different, but related, data sources. Further, in certain implementations, the first machine-learning model 404 and the second machine-learning model 410 use different input data from different non-related or indirectly related data sources.

As shown, FIG. 4 includes the dynamic LGM prompt 316, the system-level prompt 318, the large generative model 320, the domain-based report 324, and the report descriptors 322 (e.g., report instructions), which were introduced above in FIG. 3. The domain insight system 206 may select the dynamic LGM prompt 316, as described above, but based on associating or correlating both data outputs with the report descriptors 322.

To elaborate, in various implementations, the domain insight system 206 selects the dynamic LGM prompt 316 from a set of LGM prompts based on associating or correlating features, formats, and/or characteristics of both of the data outputs to an LGM prompt. In some instances, the domain insight system 206 also includes features, instructions, and/or parameters of the report descriptors 322, as described above.

In some instances, when handling multiple data outputs from multiple machine-learning models, the domain insight system 206 selects a dynamic LGM prompt that instructs the large generative model 320 to process the first data output 408 in the context of and/or as a function of the second data output 414. In some of these implementations, the domain insight system 206 determines when to process one data output in relation to another output according to a domain descriptor of the domain-based report. By combining different data modalities, the domain insight system 206 provides additional insights and explanations to the domain-based reports.

As one example, the dynamic LGM prompt 316 includes instructions to the large generative model 320 to explain a feature's variability in one data output in the context of another feature in another data output. As another example, the dynamic LGM prompt 316 includes instructions to the input data 302 to use the plotting libraries in a first data output to adjust the scale of data in a second data output to better highlight feature variation of the second data output and/or correct exaggerated feature variability that results from using the second data output alone.

In some instances, the domain insight system 206 selects a dynamic LGM prompt 316 that instructs the large generative model 320 to compare multiple data outputs of the same or different data formats. For example, if both data outputs are graphs or plots generated by the same or different machine-learning models, the dynamic LGM prompt 316 indicates to the large generative model 320 that the domain-based report 324 should provide a plain language comparison of the multiple data outputs.

In cases when the domain insight system 206 is unable to determine an LGM prompt that associates or correlates the multiple data outputs to a single LGM prompt, the domain insight system 206 generates a single LGM prompt by combining separate prompts. In these implementations, the domain insight system 206 does more than just concatenate separate LGM prompts for each data output together. Rather, the domain insight system 206 generates a dynamic LGM prompt that integrates multiple prompts together.

For example, in these implementations, the domain insight system 206 determines one LGM prompt for the first data output 408 and another LGM prompt for the second data output 414, which each corresponds to one or more of the report descriptors 322. The domain insight system 206 then generates the dynamic LGM prompt 316 by integrating the first initial context prompt with the second initial context prompt. In various implementations, the domain insight system 206 uses heuristics to determine how to integrate output data from a first data format with output data from a second output format. In some instances, the domain insight system 206 uses a machine-learning model or a large generative model to generate an integrated version of the dynamic LGM prompt.

When there are numerous data outputs, the domain insight system 206 may use the above method to combine LGM prompts for the multiple data outputs into a single LGM prompt. In some instances, the domain insight system 206 associates or correlates features, formats, and/or characteristics from a subset (e.g., less than all) of the multiple data outputs.

As shown, the large generative model 320 generates the domain-based report 324 based on the multiple machine-learning models, multiple data outputs, and/or the input data (multiple input data sources) according to the domain-based report 324. Additionally, as provided above, the large generative model 320 may further generate the domain-based report 324 based on the system-level prompt 318 and/or the report descriptors 322, as described above.

FIG. 5 illustrates an example diagram of generating a domain-based report based on multiple machine-learning models, one or more specialized models, and a large generative model according to some implementations. As noted above, FIG. 5 further expands on the concepts included in FIG. 4 and FIG. 5 by introducing specialized models.

To illustrate, FIG. 5 adds post-processing models 520 to the multi-path framework introduced in FIG. 4. As shown, the post-processing models 520 include a first specialized model 522 (e.g., a specialized algorithm) that generates a first refined data output 526 and a second specialized model 524 that generates a second refined data output 528.

In various implementations, the post-processing models 520 are machine-learning models or other algorithm-based models (e.g., a deterministic model) that provide specialized machine-learning models that further process data outputs from machine-learning models to generate refined output data. For example, if the first machine-learning model 404 is a graph recovery model that generates a conditional independence graph from the input data 302, then the first specialized model may be a traversal algorithm, a centrality algorithm, or a shortest paths algorithm, which processes the conditional independence graph to discover additional information about the input data 302 and its domain.

In some implementations, the domain insight system 206 determines to use one or more of the post-processing models 520 based on the report descriptors 322 (e.g., report instructions) indicating what type of information or contexts should be included in a domain-based report. For example, the domain insight system 206 determines from the report descriptors 322 to include a particular type of explanation for a given output format in the domain-based report. If the domain insight system 206 knows that the large generative model 320 poorly processes (e.g., inefficiently and/or inaccurately) this particular type of information, but that there is a specialized model that efficiently and accurately processes it, the domain insight system 206 uses the specialized model to refine the output data and provides the data to the large generative model 320 along with the dynamic LGM prompt 316.

In various implementations, the post-processing models 520 condition their output based on the results of the other post-processing models (which is indicated by the double-arrow line between the specialized models). For instance, the output of the second specialized model 524 is conditioned upon the output of the first specialized model 522. For example, the first specialized model 522 is a node importance algorithm that assigns importance values to nodes of a graph and the second specialized model 524 determines a graph traversal result based on these node importance values.

The domain insight system 206 may use the multiple refined data outputs in addition to, or in place of, the multiple data outputs to determine the dynamic LGM prompt 316, as described above. Additionally, in some instances, the domain insight system 206 provides the multiple refined data outputs from the post-processing models 520 to the large generative model 320 for processing as part of generating the large generative model 320.

In various implementations, the domain insight system 206 enables different specialized models with different modalities to interact with each other and with multiple data outputs of the machine-learning models. For example, the first specialized model 522 generates a first refined data output 526 based on the first data output 408 and the second data output 414.

In some implementations, the domain insight system 206 applies a post-processing model to the first data output 408, but no post-processing model to the second data output 414. In various implementations, the domain insight system 206 applies multiple post-processing models to the first data output 408, but no post-processing model to the second data output 414. In some instances, the domain insight system 206 applies multiple post-processing models to both the first data output 408 and the second data output 414. In these implementations, the post-processing models may be the same or different models for the separate sets of data output.

FIG. 6 illustrates an example graphical user interface for displaying a domain-based report generated by a large generative model, according to some implementations. As illustrated, FIG. 6 includes a computing device 600 with a display showing a graphical user interface 602. For example, the graphical user interface 602 is displayed as part of a client application that allows access to functions of the domain insight system 206, such as via a content management system. Specifically, the graphical user interface 602 includes a domain-based report 604 displayed on the computing device 600.

The domain-based report 604 includes various sections reporting different aspects and insights of the domain to which the input data belongs. In the illustrated example, the domain-based report 604 includes sections from a dataset 610, and domain-based insights 612. The lines under each section represent text narrative responses provided in the report by a large generative model. The domain-based report 604 may have fewer, additional, or different sections. For example, while not typically included the domain-based report 604 includes the system-level prompt and/or the dynamic LGM prompt used to generate the domain-based report 604. Additionally, in some cases, the incident report request includes visualizations, graphics, or other content elements.

In various implementations, the section for the dataset 610 provides a copy of the input data, output data, and/or refined output data. In some instances, the section for the dataset 610 provides a summary of the input data and/or versions of output data. Additionally, the section for the domain-based insights 612 provides insights into the domain corresponding to the input data, based on processing the input data and versions of the output data. Indeed, the large generative model provides plain language text narrative responses within this section (and often other sections), tailored to a target audience, as described above. In some implementations, the domain-based report 604 includes only the domain-based insights 612 and not any other sections.

As shown in the fictitious example, the domain-based report 604 includes plain language information about an input dataset and the domain to which it belongs. A large generative model generates the domain-based report from one or more data outputs generated by one or more machine-learning models according to a dynamic LGM prompt determined by the domain insight system 206.

As mentioned above, in a few implementations, the domain-based report 604 provides the system-level prompt and/or the dynamic LGM prompt used to generate the domain-based report. For example, the system-level prompt provides the prompt generated or selected by the domain insight system based on report descriptors and/or output data, as provided earlier (e.g., the system-level prompt for the illustrated report could be, "You are an AI assistant that helps people interpret data and visualizations. Please use graph, plot, or table semantics if provided. Describe the type of graph, types of nodes and edges, and main patterns"). In some implementations, the section for the dynamic LGM prompt provides the LGM prompt generated or selected by the domain insight system 206 e.g., the dynamic LGM prompt for the illustrated report could be, "Consider a plot described by the points in the data field. Give a high-level description of describe summary statistics and the trend. Also, consider additional insights from the graph based on the separate graph data outputs from the input data").

Figure 7:
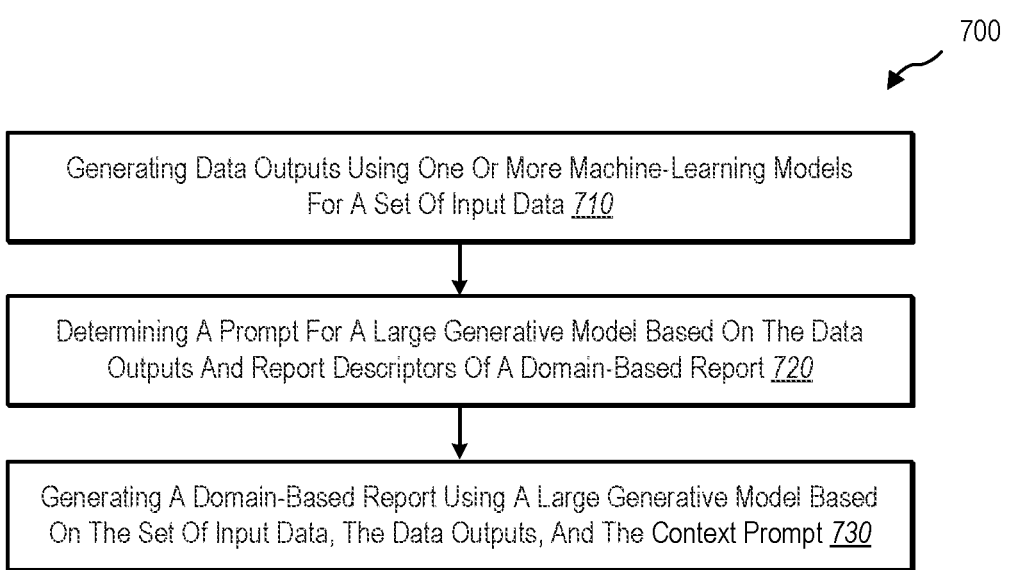
FIG. 7 illustrates an example series of acts of a computer-implemented method for generating domain-based reports from datasets using different types of machine-learning models.

Turning now to FIG. 7, this figure illustrates an example flowchart that includes a series of acts 700 for utilizing the domain insight system according to some implementations. In particular, FIG. 7 illustrates an example series of acts for generating domain-based reports from datasets using different types of machine-learning models according to some implementations.

While FIG. 7 illustrates acts according to one or more implementations, alternative implementations may omit, add to, reorder, and/or modify any of the acts shown. Furthermore, the acts of FIG. 7 can be performed as part of a method (e.g., a computer-implemented method). Alternatively, a computer-readable medium can include instructions that, when executed by a processing system having a processor, cause a computing device to perform the acts of FIG. 7.

In some implementations, a system (e.g., a processing system comprising a processor) can perform the acts of FIG. 7. For example, the acts include a system for reporting anomalous metrics in a cloud computing system. In some instances, the system includes a processing system and a computer memory including instructions that, when executed by the processing system, cause the system to perform various actions or steps.

As shown, the series of acts 700 includes act 710 of generating data outputs using one or more machine-learning models for a set of input data. For instance, in example implementations, act 710 involves generating multiple data outputs in multiple output formats using at least one machine-learning model in response to receiving a set of input data. In various implementations, act 710 includes generating a first data output in a first output format using a first machine-learning model and generating a second data output in a second output format using a second machine-learning model. In some implementations, the multiple data outputs include at least two of a graph output format, plot output format, tabular output format, histogram output format, time series output format, and text output format.

As further shown, the series of acts 700 includes act 720 of determining a prompt for a large generative model based on the data outputs and report descriptors of a domain-based report. For instance, in example implementations, act 720 involves determining a context prompt for a large generative model based on associating report descriptors of a domain-based report and the multiple output formats.

In one or more implementations, act 720 includes associating the report descriptors of the domain-based report and the multiple output formats by determining a domain descriptor of the domain-based report and matching the domain descriptor to the multiple output formats to identify the context prompt for the large generative model from a set of large generative model prompts. In some implementations, the context prompt for the large generative model provides domain information, data output information, and data output semantics regarding one or more of the multiple output formats. In various implementations, the context prompt for the large generative model causes or prompts the large generative model to process a first data output of the multiple data outputs in the context of and/or as a function of a second data output of the multiple data outputs. In some instances, this act is done according to a domain descriptor of the domain-based report.

In one or more implementations, determining the context prompt for the large generative model includes determining a first initial context prompt for the large generative model corresponding to the report descriptors of the domain-based report and a first data output format; determining a second initial context prompt for the large generative model corresponding to the report descriptors of the domain-based report and a second data output format that is different from the first data output format; and generating the first data output format by integrating the first initial context prompt with the second initial context prompt. In some instances, the context prompt does not include the first initial context prompt followed by the second initial context prompt and/or does not concatenate the first initial context prompt and the second initial context prompt. In some instances, the report descriptors of the domain-based report include sections in the domain-based report and content parameters and/or instructions of the sections.

As further shown, the series of acts 700 includes act 730 of generating a domain-based report using a large generative model based on the set of input data, the data outputs, and the context prompt. For instance, in example implementations, act 730 involves generating the domain-based report based on the set of input data, the multiple data outputs, the context prompt, and the report descriptors of the domain-based report using the large generative model. In various implementations, the domain-based report includes a plain language description of a domain to which the set of input data belongs based on the large generative model processing the multiple output formats according to the context prompt for the large generative model.

In some implementations, the series of acts 700 includes additional actions. For example, in some implementations, the series of acts 700 includes generating a refined data output for a first data output of the multiple data outputs using a specialized model. In one or more implementations, the series of acts 700 also includes determining the specialized model from a set of specialized models based on the domain-based report requirements.

In some instances, generating the domain-based report is further based on providing a system-level prompt to the large generative model with the set of input data, the multiple data outputs, the context prompt, and the report descriptors of the domain-based report, wherein the system-level prompt is different from the context prompt of the large generative model. In one or more implementations, determining the context prompt for the large generative model is further based on associating the refined data output or the specialized model to the report descriptors of the domain-based report and/or generating the domain-based report is further based on providing the refined data output to the large generative model.

In one or more implementations, generating the domain-based report is further based on providing a system-level prompt to the large generative model with the first data output, the context prompt, and the domain-based report descriptors; and the system-level prompt includes audience instructions, general framing instructions, and a responsible response consideration instructions. In various implementations, the series of acts 700 includes determining the system-level prompt based on a domain descriptor of the domain-based report.

In one or more implementations, the series of acts 700 includes additional and/or different actions. For example, the series of acts 700 includes generating a first data output in a first output format using a first machine-learning model in response to receiving a set of input data; determining a context prompt for a large generative model by associating a domain-based report descriptors with the first output format; and generating a domain-based report based on the set of input data, the first data output, the context prompt, and the domain-based report descriptors using the large generative model.

In various implementations, the series of acts 700 includes generating a second data output in a second output format using a second machine-learning model with the set of input data. In some instances, the second output format differs from the first output format; determining the context prompt for the large generative model by associating the domain-based report descriptors with the first output format and the second output format; and generating the domain-based report based on the set of input data, the first data output, the second data output, the context prompt, and the domain-based report descriptors using the large generative model.

Figure 8:
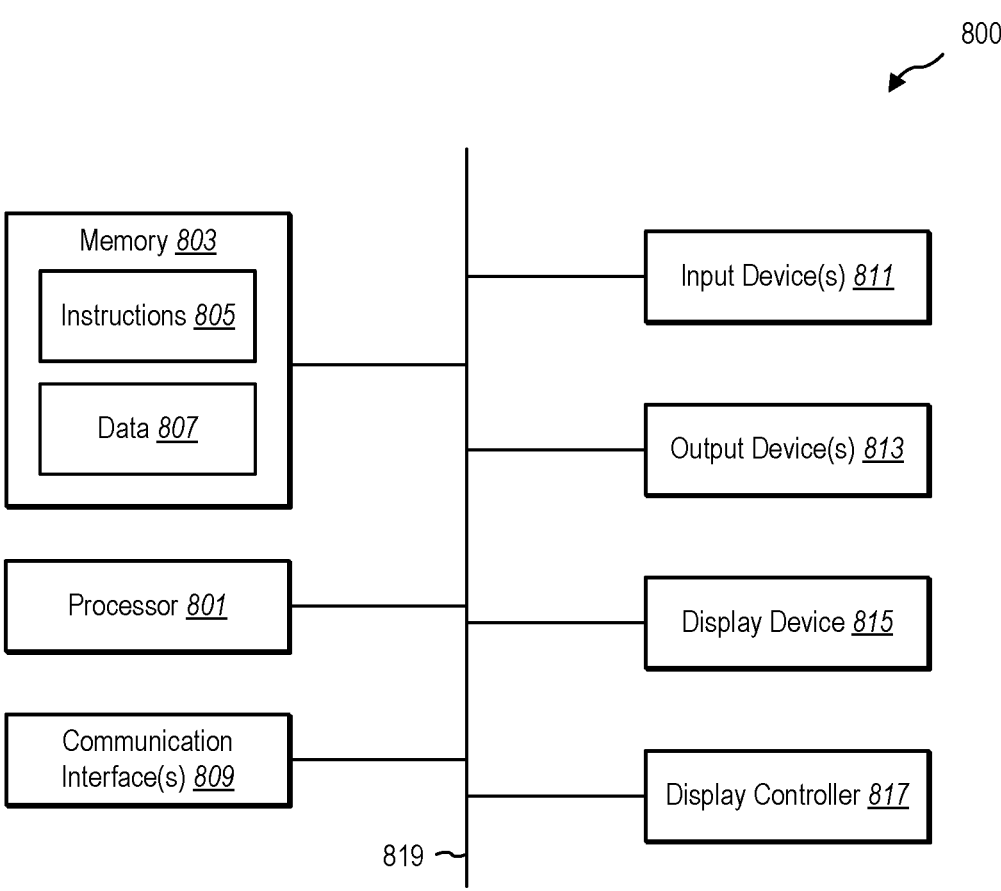
FIG. 8 illustrates example components included within a computer system.

FIG. 8 illustrates certain components that may be included within a computer system 800. The computer system 800 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 800 represents one or more of the client devices, server devices, or other computing devices described above. For example, the computer system 800 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processing system including a processor 801. The processor 801 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 801 may be referred to as a central processing unit (CPU) and may cause computer-implemented instructions to be performed. Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For clarity, the various buses are illustrated in FIG. 8 as a bus system 819.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating domain-based reports from datasets, the computer-implemented method comprising:
   generating multiple data outputs in multiple output formats using at least one machine-learning model in response to receiving a set of input data;
   determining a context prompt for a large generative model by:
      determining a domain descriptor from report descriptors associated with a domain-based report; and
      matching the domain descriptor to the multiple output formats by mapping features of the multiple data outputs and the domain descriptor into an embedding space to identify the context prompt for the large generative model from a set of large generative model prompts mapped to the embedding space; and
   generating the domain-based report based on the set of input data, the multiple data outputs, the context prompt, and the report descriptors of the domain-based report using the large generative model.

2. The computer-implemented method of claim 1, wherein generating the domain-based report is further based on providing a system-level prompt to the large generative model with the set of input data, the multiple data outputs, the context prompt, and the report descriptors of the domain-based report, wherein the system-level prompt is different from the context prompt of the large generative model.

3. The computer-implemented method of claim 1, further comprising generating a refined data output for a first data output of the multiple data outputs using a specialized model.

4. The computer-implemented method of claim 3, further comprising determining the specialized model from a set of specialized models based on domain-based report requirements.

5. The computer-implemented method of claim 3, wherein:
   determining the context prompt for the large generative model is further based on associating the refined data output or the specialized model to the report descriptors; and
   generating the domain-based report is further based on providing the refined data output to the large generative model.

6. The computer-implemented method of claim 1, wherein generating the multiple data outputs comprises:
   generating a first data output in a first output format using a first machine-learning model; and
   generating a second data output in a second output format using a second machine-learning model.

7. The computer-implemented method of claim 1, further comprising determining associations between the report descriptors of the domain-based report and the multiple output formats.

8. The computer-implemented method of claim 1, wherein the context prompt for the large generative model provides domain information, data output information, and data output semantics regarding one or more of the multiple output formats.

9. The computer-implemented method of claim 1, wherein the context prompt for the large generative model prompts the large generative model to process a first data output of the multiple data outputs in context of a second data output of the multiple data outputs.

10. The computer-implemented method of claim 1, wherein determining the context prompt for the large generative model comprises:
   determining a first initial context prompt for the large generative model corresponding to the report descriptors of the domain-based report and a first data output format;
   determining a second initial context prompt for the large generative model corresponding to the report descriptors of the domain-based report and a second data output format that is different from the first data output format; and
   generating the first data output format by integrating the first initial context prompt with the second initial context prompt, wherein the context prompt does not concatenate the first initial context prompt and the second initial context prompt.

11. The computer-implemented method of claim 1, wherein the domain-based report includes a plain language description of a domain to which the set of input data belongs based on the large generative model processing the multiple output formats according to the context prompt for the large generative model.

12. The computer-implemented method of claim 1, wherein the report descriptors of the domain-based report comprise sections in the domain-based report and content instructions of the sections.

13. The computer-implemented method of claim 1, wherein the multiple data outputs include at least two of a graph output format, plot output format, tabular output format, histogram output format, time series output format, and text output format.

14. A computer-implemented method for generating domain-based reports from datasets, the computer-implemented method comprising:
   generating a first data output in a first output format using a first machine-learning model in response to receiving a set of input data;

determining a context prompt for a large generative model by:

determining a domain descriptor of domain-based report descriptors to be generated by the large generative model; and matching the domain descriptor to the first output format to identify the context prompt for the large generative model from a set of large generative model prompts; and generating a domain-based report based on the set of input data, the first data output, the context prompt, and the domain-based report descriptors using the large generative model.

15. The computer-implemented method of claim 14, further comprising:

generating a second data output in a second output format using a second machine-learning model with the set of input data, wherein the second output format differs from the first output format;

determining the context prompt for the large generative model by associating the domain-based report descriptors with the first output format and the second output format; and generating the domain-based report based on the set of input data, the first data output, the second data output, the context prompt, and the domain-based report descriptors using the large generative model.

16. The computer-implemented method of claim 15, wherein the context prompt for the large generative model prompts the large generative model to process the first data output in context of the second data output.

17. The computer-implemented method of claim 14, wherein:

generating the domain-based report is further based on providing a system-level prompt to the large generative model with the first data output, the context prompt, and the domain-based report descriptors; and the system-level prompt includes audience instructions, general framing instructions, and responsible response consideration instructions.

18. The computer-implemented method of claim 17, further comprising determining the system-level prompt based on a domain descriptor of the domain-based report.

19. A system for generating domain-based reports from datasets, the system comprising:

a processing system; and a computer memory comprising instructions that, when executed by the processing system, cause the system to perform operations of:

generating multiple data outputs in multiple output formats using at least one machine-learning model in response to receiving a set of input data;

determining a context prompt for a large generative model by:

determining a domain descriptor from report descriptors of a domain-based report to be generated by the large generative model; and matching the domain descriptor to the multiple output formats to identify the context prompt for the large generative model from a set of large generative model prompts; and generating the domain-based report based on the set of input data, the multiple data outputs, the context prompt, and the report descriptors of the domain-based report using the large generative model.

20. The system of claim 19, further comprising:

determining a specialized model from a set of specialized models based on domain-based report requirements;

generating a refined data output for a first data output of the multiple data outputs using the specialized model;

determining the context prompt for the large generative model based on associating the report descriptors of the domain-based report, the multiple output formats, and the refined data output or the specialized model; and generating the domain-based report based on providing the set of input data, the multiple data outputs, the context prompt, the report descriptors of the domain-based report, and the refined data output to the large generative model.

* * * * *